*(12)* United States Patent
Lee et al.

(10) Patent No.: US 10,018,250 B2
(45) Date of Patent: Jul. 10, 2018

(54) POWER TRANSMITTING APPARATUS FOR VEHICLE

(71) Applicant: Hyundai Motor Company, Seoul (KR)

(72) Inventors: Sueng Ho Lee, Seoul (KR); Chang Wook Lee, Suwon-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 170 days.

(21) Appl. No.: 15/045,583

(22) Filed: Feb. 17, 2016

(65) Prior Publication Data

US 2016/0160962 A1 Jun. 9, 2016

Related U.S. Application Data

(62) Division of application No. 14/090,977, filed on Nov. 26, 2013, now Pat. No. 9,297,443.

(30) Foreign Application Priority Data

Jul. 24, 2013 (KR) .......................... 10-2013-0087628

(51) Int. Cl.
| | |
|---|---|
| *F16H 3/08* | (2006.01) |
| *F16H 3/085* | (2006.01) |
| *F16H 3/087* | (2006.01) |
| *F16H 3/00* | (2006.01) |
| *F16H 3/093* | (2006.01) |

(52) U.S. Cl.
CPC ............ *F16H 3/085* (2013.01); *F16H 3/006* (2013.01); *F16H 3/087* (2013.01); *F16H 2003/0931* (2013.01); *Y10T 74/19228* (2015.01)

(58) Field of Classification Search
CPC ............ F16H 3/006; F16H 2003/0931; F16H 2200/0056; F16H 3/087
See application file for complete search history.

(56) References Cited

U.S. PATENT DOCUMENTS

| | | | |
|---|---|---|---|
| 2,658,405 | A | 11/1953 | Dodge |
| 3,589,483 | A | 6/1971 | Smith |
| 6,209,407 | B1 | 4/2001 | Heinzel et al. |
| 7,155,994 | B2 | 1/2007 | Gumpoltsberger |
| 7,383,749 | B2 | 6/2008 | Schäfer et al. |
| 2007/0199393 | A1 | 8/2007 | Hattori |
| 2008/0202267 | A1 | 8/2008 | Hendrickson et al. |
| 2008/0202268 | A1 | 8/2008 | Carey et al. |
| 2009/0120221 | A1 | 5/2009 | Chazotte |
| 2010/0294057 | A1 | 11/2010 | Sowul |
| 2015/0059504 | A1 | 3/2015 | Lee et al. |

FOREIGN PATENT DOCUMENTS

| | | |
|---|---|---|
| CN | 1621715 A | 6/2005 |
| KR | 10-2009-0021575 A | 3/2009 |

*Primary Examiner* — Jake Cook
(74) *Attorney, Agent, or Firm* — Morgan, Lewis & Bockius LLP

(57) ABSTRACT

A power transmitting apparatus may include first and second input shafts selectively receiving torque of a power source through first and second clutches, first and second output shafts disposed in parallel with the first and second input shafts, a plurality of input gears disposed on the first and second input shafts, and at least five speed gears selectively connected to the first and second output shafts through a plurality of synchronizer modules.

12 Claims, 6 Drawing Sheets

FIG.2

| | CL1 | CL2 | SL1 | | | SL2 | | | SL3 | | SL4 | | | SL5 | | | |
|---|---|---|---|---|---|---|---|---|---|---|---|---|---|---|---|---|---|
| | | | D7-1 | N | R | D7-2 | N | D5 | N | D6 | D4 | N | D2 | D1 | N | D3 | |
| R | ● | | | | ● | ○ | ● | | | ● | | ● | | | ○ | | |
| 1ST | | ● | | ○ | | | ● | ○ | | | | ○ | | ● | | | |
| 2ND | ● | | | ● | | | ○ | ● | | | | | ● | | ○ | | |
| 3RD | | ● | | ○ | | | ● | ○ | | | | ○ | | | | | ● |
| 4TH | ● | | | ● | | | ○ | | ● | ● | | | | | ○ | | |
| 5TH | | ● | | ○ | | | | ● | ○ | | | ○ | | | ● | | |
| 6TH | ● | | | ● | | | ○ | | | ● | | ● | | | ○ | | |
| 7TH | | ● | ● | | | | ○ | | ● | | | ● | | | ○ | | Used in 7TH ↔ odd-numbered speed shift |
| | | ● | | ○ | | ● | | | | ○ | | ○ | | | ● | | Used in 7TH ↔ even-numbered speed shift |
| | ● | ● | ● | | | ● | | | ● | | | ● | | | ● | | At normal 7TH |

FIG.3

| Exemplary embodiments | |
|---|---|
| Gear ratio | Step ratio |
| 16.9133 | |
| 10.0932 | 1.6757 |
| 6.5290 | 1.5459 |
| 4.7650 | 1.3702 |
| 3.7240 | 1.2796 |
| 3.0827 | 1.2080 |
| 2.5658 | 1.2014 |
| Improvement of step ratio | |

POWER TRANSMITTING APPARATUS FOR VEHICLE

CROSS-REFERENCE TO RELATED APPLICATION

The present application is a Divisional of U.S. patent application Ser. No. 14/090,977, filed Nov. 26, 2013, which claims priority to Korean Patent Application Number 10-2013-0087628 filed Jul. 24, 2013, the entire contents of which is are incorporated herein for all purposes by these references.

BACKGROUND OF THE INVENTION

Field of the Invention

The present invention relates to a double clutch power transmitting apparatus. More particularly, the present invention relates to a power transmitting apparatus for a vehicle which improves mountability by minimizing a length of the power transmitting apparatus, enhances drivability and fuel economy by preventing distortion of step ratios, and further enhances drivability by enabling of skip shift from the highest shift-speed to a specific shift-speed.

Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency and change and addition of components is very easy in the DCT. Therefore, the DCT can meet fuel consumption regulations and multi-speeds efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a vehicle having advantages of improving mountability by minimizing a length of the power transmitting apparatus, enhancing drivability and fuel economy by preventing distortion of step ratios, and further enhancing drivability by enabling of skip shift from the highest shift-speed to a specific shift-speed.

A power transmitting apparatus for a vehicle according to an aspect of the present invention may include first and second input shafts selectively receiving torque of a power source through first and second clutches, first and second output shafts disposed in parallel with the first and second input shafts, a plurality of input gears disposed on the first and second input shafts, and at least five speed gears selectively connected to the first and second output shafts through a plurality of synchronizer modules.

Each speed gear may be always engaged with each input gear such that the torque of the power source is changed by selective operation of the plurality of synchronizer modules and the changed torque is transmitted to the first output shaft or the second output shaft.

One of the speed gears on the first output shaft and one of the speed gears on the second output shaft may be engaged to any one of the input gears on the first input shaft, the one speed gear on the first output shaft may be one of a highest shift-speed ($N^{th}$) speed gear and an $(N-3)^{th}$ speed gear, and the one speed gear on the second output shaft may be the other of the $N^{th}$ speed gear and the $(N-3)^{th}$ speed gear.

Another of the speed gears on the first output shaft and another of the speed gears on the second output shaft may be engaged to any one of the input gears on the second input shaft, another speed gear on the first output shaft may be one of an $(N-2)^{th}$ speed gear and an $(N-4)^{th}$ speed gear, and another speed gear on the second output shaft may be the other of the $(N-2)^{th}$ speed gear and the $(N-4)^{th}$ speed gear.

Other of the speed gears on the first output shaft may be engaged to another input gear on the second input shaft, and the other of the speed gears on the first output shaft may be another highest shift-speed ($N^{th}$) speed gear.

The highest shift-speed ($N^{th}$) may be any one of the fifth forward speed to the tenth forward speed.

The first input shaft may be a hollow shaft and the second input shaft may penetrate the first input shaft and may be disposed on the same axis as the first input shaft.

The speed gears may further includes a reverse speed gear.

The power transmitting apparatus may further include a reverse speed device including a reverse speed shaft disposed in parallel with the first output shaft, a reverse input gear disposed on the reverse speed shaft and engaged with any one input gear on the first input shaft or the second input shaft, and an idle gear disposed on the reverse speed shaft and engaged with the reverse speed gear.

First, second, and third input gears may be disposed on the first input shaft, and fourth, fifth, and sixth input gears may be disposed on the second input shaft.

In various exemplary embodiments, the reverse speed gear and one seventh speed gear selectively connected to the first output shaft through a first synchronizer module, a fifth speed gear and another seventh speed gear selectively connected to the first output shaft through a second synchronizer module, and a sixth speed gear selectively connected to the first output shaft through a third synchronizer module may be disposed on the first output shaft.

In various exemplary embodiments, the reverse speed gear may be engaged with the idle gear, the reverse input gear may be engaged with the first input gear, the one seventh speed gear may be engaged with the second input gear, the fifth speed gear may be engaged with the fourth input gear, another seventh speed gear may be engaged with the sixth input gear, and the sixth speed gear may be engaged with the third input gear.

In various exemplary embodiments, a second speed gear and a fourth speed gear selectively connected to the second output shaft through a fourth synchronizer module, and a third speed gear and a first speed gear selectively connected to the second output shaft through a fifth synchronizer module may be disposed on the second output shaft.

In various exemplary embodiments, the second speed gear may be engaged with the first input gear, the fourth speed gear may be engaged with the second input gear, the third speed gear may be engaged with the fourth input gear, and the first speed gear may be engaged with the fifth input gear.

In various exemplary embodiments, the reverse speed gear may be engaged with the idle gear, the reverse input gear may be engaged with the first input gear, the one seventh speed gear may be engaged with the second input gear, the fifth speed gear may be engaged with the sixth input gear, another seventh speed gear may be engaged with the fourth input gear, and the sixth speed gear may be engaged with the third input gear.

In various exemplary embodiments, the second speed gear may be engaged with the first input gear, the fourth speed gear may be engaged with the second input gear, the first speed gear may be engaged with the fifth input gear, and the third speed gear may be engaged with the sixth input gear.

In various exemplary embodiments, the reverse speed gear may be engaged with the idle gear, the reverse input gear may be engaged with the second input gear, the one seventh speed gear may be engaged with the first input gear, the fifth speed gear may be engaged with the fourth input gear, another seventh speed gear may be engaged with the sixth input gear, and the sixth speed gear may be engaged with the third input gear.

In various exemplary embodiments, the second speed gear may be engaged with the second input gear, the fourth speed gear may be engaged with the first input gear, the first speed gear may be engaged with the fifth input gear, and the third speed gear may be engaged with the fourth input gear.

In various exemplary embodiments, the reverse speed gear may be engaged with the idle gear, the reverse input gear may be engaged with the second input gear, the one seventh speed gear may be engaged with the first input gear, the fifth speed gear may be engaged with the sixth input gear, another seventh speed gear may be engaged with the fourth input gear, and the sixth speed gear may be engaged with the third input gear.

In various exemplary embodiments, the second speed gear may be engaged with the second input gear, the fourth speed gear may be engaged with the first input gear, the first speed gear may be engaged with the fifth input gear, and the third speed gear may be engaged with the sixth input gear.

A power transmitting apparatus for a vehicle according to another aspect of the present invention may include: a first clutch connected to a power source and selectively outputting torque of the power source; a second clutch connected to the power source and selectively outputting the torque of the power source; a first input shaft being a hollow shaft, selectively receiving the torque of the power source through the first clutch, and provided with first, second, and third input gears disposed on an exterior circumference thereof; a second input shaft configured for penetrating the first input shaft without rotational interference therebetween, selectively receiving the torque of the power source through the second clutch, and provided with fourth, fifth, and sixth input gears disposed on an exterior circumference thereof; first and second output shafts disposed in parallel with the first and second input shafts; a reverse speed device including a reverse speed shaft and an idle gear and a reverse input gear fixedly disposed on the reverse speed shaft; a reverse speed gear disposed on the first output shaft, selectively connected to the first output shaft through a first synchronizer module, and engaged with the idle gear connected through the reverse speed shaft to the reverse input gear engaged with the first input gear; one seventh speed gear disposed on the first output shaft, selectively connected to the first output shaft through the first synchronizer module, and engaged with the second input gear; a fifth speed gear disposed on the first output shaft, selectively connected to the first output shaft through a second synchronizer module, and engaged with the fourth input gear; another seventh speed gear disposed on the first output shaft, selectively connected to the first output shaft through the second synchronizer module, and engaged with the sixth input gear; a sixth speed gear disposed on the first output shaft, selectively connected to the first output shaft through a third synchronizer module, and engaged with the third input gear; a second speed gear disposed on the second output shaft, selectively connected to the second output shaft through a fourth synchronizer module, and engaged with the first input gear; a fourth speed gear disposed on the second output shaft, selectively connected to the second output shaft through the fourth synchronizer module, and engaged with the second input gear; a third speed gear disposed on the second output shaft, selectively connected to the second output shaft through a fifth synchronizer module, and engaged with the fourth input gear; and a first speed gear disposed on the second output shaft, selectively connected to the second output shaft through the fifth synchronizer module, and engaged with the fifth input gear.

A power transmitting apparatus for a vehicle according to other aspect of the present invention may include: a first clutch connected to a power source and selectively outputting torque of the power source; a second clutch connected to the power source and selectively outputting the torque of the power source; a first input shaft being a hollow shaft, selectively receiving the torque of the power source through the first clutch, and provided with first, second, and third input gears disposed on an exterior circumference thereof; a second input shaft configured for penetrating the first input shaft without rotational interference therebetween, selectively receiving the torque of the power source through the second clutch, and provided with fourth, fifth, and sixth input gears disposed on an exterior circumference thereof; first and second output shafts disposed in parallel with the first and second input shafts; a reverse speed device including a reverse speed shaft and an idle gear and a reverse input gear fixedly disposed on the reverse speed shaft; a reverse speed gear disposed on the first output shaft, selectively connected to the first output shaft through a first synchronizer module, and engaged with the idle gear connected through the reverse speed shaft to the reverse input gear engaged with the first input gear; one seventh speed gear disposed on the first output shaft, selectively connected to the first output shaft through the first synchronizer module, and engaged with the second input gear; a fifth speed gear disposed on the first output shaft, selectively connected to the first output shaft through a second synchronizer module, and engaged with the sixth input gear; another seventh speed gear disposed on the first output shaft, selectively connected to the first output shaft through the second synchronizer module, and engaged with the fourth input gear; a sixth speed gear disposed on the first output shaft, selectively connected to the first output shaft through a third synchronizer module, and engaged with the third input gear; a second speed gear disposed on the second output shaft, selectively connected to the second output shaft through a fourth synchronizer module, and engaged with the first input gear; a fourth speed gear disposed on the second output shaft, selectively connected to the second output shaft through the fourth synchronizer module, and engaged with the second input gear; a third speed gear disposed on the second output shaft, selectively connected to the second output shaft through a fifth synchronizer module, and engaged with the sixth input gear; and a first speed gear disposed on the second output shaft, selectively connected to the second output shaft through the fifth synchronizer module, and engaged with the fifth input gear.

A power transmitting apparatus for a vehicle according to other aspect of the present invention may include: a first clutch connected to a power source and selectively outputting torque of the power source; a second clutch connected to the power source and selectively outputting the torque of the power source; a first input shaft being a hollow shaft, selectively receiving the torque of the power source through the first clutch, and provided with first, second, and third input gears disposed on an exterior circumference thereof; a second input shaft configured for penetrating the first input shaft without rotational interference therebetween, selectively receiving the torque of the power source through the second clutch, and provided with fourth, fifth, and sixth input gears disposed on an exterior circumference thereof; first and second output shafts disposed in parallel with the first and second input shafts; a reverse speed device including a reverse speed shaft and an idle gear and a reverse input gear fixedly disposed on the reverse speed shaft; a reverse speed gear disposed on the first output shaft, selectively connected to the first output shaft through a first synchronizer module, and engaged with the idle gear connected through the reverse speed shaft to the reverse input gear engaged with the second input gear; one seventh speed gear disposed on the first output shaft, selectively connected to the first output shaft through the first synchronizer module, and engaged with the first input gear; a fifth speed gear disposed on the first output shaft, selectively connected to the first output shaft through a second synchronizer module, and engaged with the fourth input gear; another seventh speed gear disposed on the first output shaft, selectively connected to the first output shaft through the second synchronizer module, and engaged with the sixth input gear; a sixth speed gear disposed on the first output shaft, selectively connected to the first output shaft through a third synchronizer module, and engaged with the third input gear; a second speed gear disposed on the second output shaft, selectively connected to the second output shaft through a fourth synchronizer module, and engaged with the second input gear; a fourth speed gear disposed on the second output shaft, selectively connected to the second output shaft through the fourth synchronizer module, and engaged with the first input gear; a third speed gear disposed on the second output shaft, selectively connected to the second output shaft through a fifth synchronizer module, and engaged with the fourth input gear; and a first speed gear disposed on the second output shaft, selectively connected to the second output shaft through the fifth synchronizer module, and engaged with the fifth input gear.

A power transmitting apparatus for a vehicle according to other aspect of the present invention may include: a first clutch connected to a power source and selectively outputting torque of the power source; a second clutch connected to the power source and selectively outputting the torque of the power source; a first input shaft being a hollow shaft, selectively receiving the torque of the power source through the first clutch, and provided with first, second, and third input gears disposed on an exterior circumference thereof; a second input shaft configured for penetrating the first input shaft without rotational interference therebetween, selectively receiving the torque of the power source through the second clutch, and provided with fourth, fifth, and sixth input gears disposed on an exterior circumference thereof; first and second output shafts disposed in parallel with the first and second input shafts; a reverse speed device including a reverse speed shaft and an idle gear and a reverse input gear fixedly disposed on the reverse speed shaft; a reverse speed gear disposed on the first output shaft, selectively connected to the first output shaft through a first synchronizer module, and engaged with the idle gear connected through the reverse speed shaft to the reverse input gear engaged with the second input gear; one seventh speed gear disposed on the first output shaft, selectively connected to the first output shaft through the first synchronizer module, and engaged with the first input gear; a fifth speed gear disposed on the first output shaft, selectively connected to the first output shaft through a second synchronizer module, and engaged with the sixth input gear; another seventh speed gear disposed on the first output shaft, selectively connected to the first output shaft through the second synchronizer module, and engaged with the fourth input gear; a sixth speed gear disposed on the first output shaft, selectively connected to the first output shaft through a third synchronizer module, and engaged with the third input gear; a second speed gear disposed on the second output shaft, selectively connected to the second output shaft through a fourth synchronizer module, and engaged with the second input gear; a fourth speed gear disposed on the second output shaft, selectively connected to the second output shaft through the fourth synchronizer module, and engaged with the first input gear; a third speed gear disposed on the second output shaft, selectively connected to the second output shaft through a fifth synchronizer module, and engaged with the sixth input gear; and a first speed gear disposed on the second output shaft, selectively connected to the second output shaft through the fifth synchronizer module, and engaged with the fifth input gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of a power transmitting apparatus for a vehicle according to the various exemplary embodiments of the present invention.

FIG. 3 is a table illustrating step ratios of power transmitting apparatus for a vehicle according to the various exemplary embodiments of the present invention.

Figure 1:
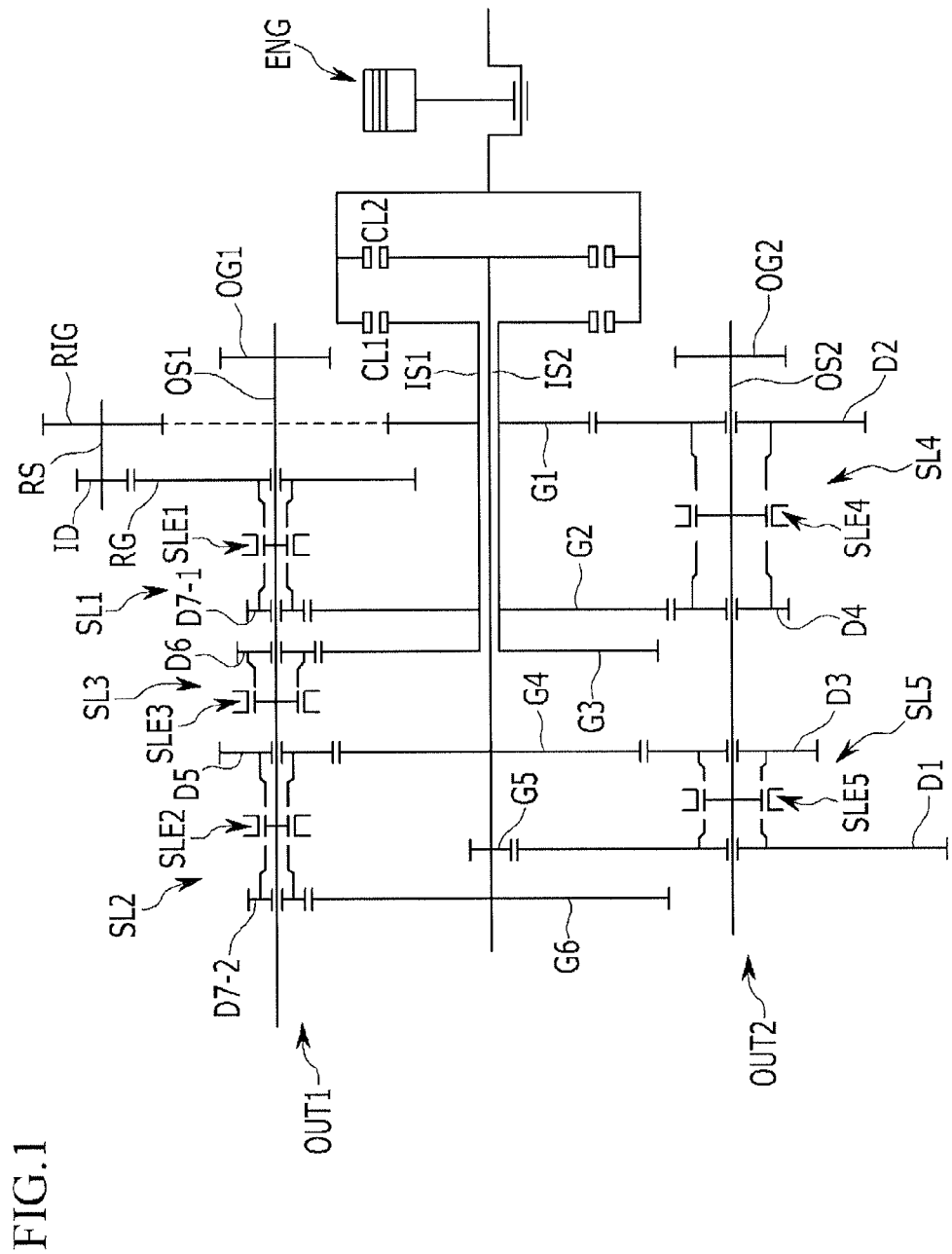
FIG. 1 is a schematic diagram of a power transmitting apparatus for a vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

In addition, it is exemplified but is not limited in the exemplary embodiments of the present invention that a highest shift-speed is a seventh forward speed. The highest shift-speed may be any one of a fifth forward speed to a tenth forward speed within the scope of the present invention.

FIG. 1 is a schematic diagram of a power transmitting apparatus for a vehicle according to the first exemplary embodiment of the present invention.

Referring to FIG. 1, a power transmitting apparatus for a vehicle according to the first exemplary embodiment of the present invention includes first and second clutches CL1 and CL2 for variably transmitting torque.

The first clutch CL1 and the second clutch CL2 selectively transmits torque of an engine ENG that is a power source respectively to first and second input shafts IS1 and IS2.

That is, the first clutch CL1 selectively connects the first input shaft IS1 with an output side of the engine ENG, and the second clutch CL2 selectively connects the second input shaft IS2 with the output side of the engine ENG.

The first and second clutches CL1 and CL2 may be conventional multi-plate clutches of wet type, and are controlled by a hydraulic control system.

The first and second input shafts IS1 and IS2 are disposed on the same axis.

The first input shaft IS1 is a hollow shaft, and a front end portion of the first input shaft IS1 is selectively connected to the output side of the engine ENG through the first clutch CL1.

In addition, first, second, and third input gears G1, G2, and G3 are disposed on the first input shaft IS1 with predetermined distances in a named sequence from a front portion to a rear portion.

The second input shaft IS2 is inserted in the first input shaft IS1 without rotational interference with the first input shaft IS1. A front end portion of the second input shaft IS2 is selectively connected to the output side of the engine ENG through the second clutch CL2.

In addition, fourth, fifth, and sixth input gears G4, G5, and G6 are disposed on the second input shaft IS2 with predetermined distances. The fourth, fifth, and sixth input gears G4, G5, and G6 are positioned at a rear portion of the second input shaft IS2 penetrating the first input shaft IS1 and are disposed in a sequence of the fourth, fifth, and sixth input gears G4, G5, and G6 from a front portion to a rear portion.

The first, second, third, fourth, fifth, and sixth input gears G1, G2, G3, G4, G5, and G6 are input gears operating at each speed. That is, the first input gear G1 is operated at a reverse speed and a second forward speed, the second input gear G2 is operated at an odd-numbered seventh forward speed and a fourth forward speed, the third input gear G3 is operated at a sixth forward speed, the fourth input gear G4 is operated at a fifth forward speed and a third forward speed, the fifth input gear G5 is operated at a first forward speed, and the sixth input gear G6 is operated at an even-numbered seventh forward speed.

That is, the input gears for even-numbered speeds and the reverse speed are disposed on the first input shaft IS1, and the input gears for odd-numbered speeds are disposed on the second input shaft IS2.

First and second speed output units OUT1 and OUT2 disposed in parallel with the first and second input shafts IS1 and IS2 are provided. The first and second speed output units OUT1 and OUT2 receive torque from each input gear, convert the torque, and output the converted torque.

The first speed output unit OUT1 includes a first output shaft OS1 disposed in parallel with the first and second input shafts IS1 and IS2.

A reverse speed gear RG and an odd-numbered seventh speed gear D7-1 selectively connected to the first output shaft OS1 through a first synchronizer module SL1 are disposed on the first output shaft OS1.

Herein, the reverse speed gear RG is operably connected to the first input gear G1 on the first input shaft IS1 through a reverse speed device.

That is, the reverse speed device includes a reverse speed shaft RS disposed in parallel with the first output shaft OS1, a reverse input gear RIG disposed on an end portion of the reverse speed shaft RS and engaged with the first input gear G1 on the first input shaft IS1, and an idle gear ID disposed on the other end portion of the reverse speed shaft RS and engaged with the reverse speed gear RG on the first output shaft OS1.

If the first input shaft IS1 rotates, torque of the first input gear G1 is transmitted to the reverse speed gear RG as an inverse rotation speed through the reverse input gear RIG and the idle gear ID.

In addition, the odd-numbered seventh speed gear D7-1 is engaged with the second input gear G2 on the first input shaft IS1.

In addition, a fifth speed gear D5 and an even-numbered seventh speed gear D7-2 selectively connected to the first output shaft OS1 through a second synchronizer module SL2 are disposed on the first output shaft OS1.

Herein, the fifth speed gear D5 and the even-numbered seventh speed gear D7-2 are engaged respectively to the fourth input gear G4 and the sixth input gear G6 on the second input shaft IS2.

In addition, a sixth speed gear D6 selectively connected to the first output shaft OS1 through a third synchronizer module SL3 is disposed on the first output shaft OS1.

Herein, the sixth speed gear D6 is engaged with the third input gear G3 on the first input shaft IS1.

In addition, the torque converted by the first speed output unit OUT1 is transmitted to a conventional differential device through a first output gear OG1 mounted at a front end portion of the first output shaft OS1.

The second speed output unit OUT2 includes a second output shaft OS2 disposed in parallel with the first and second input shafts IS1 and IS2.

In addition, a second speed gear D2 and a fourth speed gear D4 selectively connected to the second output shaft OS2 through a fourth synchronizer module SL4 are disposed on the second output shaft OS2.

Herein, the second speed gear D2 and the fourth speed gear D4 are engaged respectively to the first input gear G1 and the second input gear G2 on the first input shaft IS1.

In addition, a third speed gear D3 and a first speed gear D1 selectively connected to the second output shaft OS2 through a fifth synchronizer module SL5 are disposed on the second output shaft OS2.

Herein, the third speed gear D3 and the first speed gear D1 are engaged respectively to the fourth input gear G4 and the fifth input gear G5 on the second input shaft IS2.

In addition, the torque converted by the second speed output unit OUT2 is transmitted to the conventional differential device through the second output gear OG2 mounted at a front end portion of the second output shaft OS2.

Total gear ratio of the second input gear G2 and the odd-numbered seventh speed gear D7-1 is the same as that of the sixth input gear G6 and the even-numbered seventh speed gear D7-2.

Herein, a synchronizer module means a device which operably connects two members which can rotate relatively and may include a synchromesh, a dog clutch, a clutch and so on. Since the first, second, third, fourth, and fifth synchronizer modules SL1, SL2, SL3, SL4, and SL5 are well known to a person of an ordinary skill in the art, detailed description thereof will be omitted. Sleeves SLE1, SLE2, SLE3, SLE4, and SLE5 applied respectively to the first, second, third, fourth, and fifth synchronizer modules SL1, SL2, SL3, SL4, and SL5, as well known to a person of an ordinary skill in the art, are operated by additional actuators and the actuators are controlled by a transmission control unit.

FIG. 2 is an operational chart of a power transmitting apparatus for a vehicle according to the first exemplary embodiment of the present invention.

[Reverse Speed]

At the reverse speed R, as shown in FIG. 2, the first output shaft OS1 and the reverse speed gear RG are operably connected through the sleeve SLE1 of the first synchronizer module SL1. After that, the first clutch CL1 is operated. Then, shift to the reverse speed is completed.

[First Forward Speed]

At the first forward speed $1^{ST}$, as shown in FIG. 2, the first speed gear D1 and the second output shaft OS2 are operably connected through the sleeve SLE5 of the fifth synchronizer module SL5. After that, the second clutch CL2 is operated. Then, shift to the first forward speed is completed.

[Second Forward Speed]

If vehicle speed increases at the first forward speed $1^{ST}$ and shift to the second forward speed $2^{ND}$ is necessary, as shown in FIG. 2, the second speed gear D2 and the second output shaft OS2 are operably connected through the sleeve SLE4 of the fourth synchronizer module SL4. After that, the second clutch CL2 is released and the first clutch CL1 is operated. Then, the shift to the second forward speed is completed.

After the shift to the second forward speed is completed, the sleeve SLE5 of the fifth synchronizer module SL5 is moved to a neutral position.

[Third Forward Speed]

If the vehicle speed increases at the second forward speed $2^{ND}$ and shift to the third forward speed $3^{RD}$ is necessary, as shown in FIG. 2, the third speed gear D3 and the second output shaft OS2 are operably connected through the sleeve SLE5 of the fifth synchronizer module SL5. After that, the first clutch CL1 is released and the second clutch CL2 is operated. Then, the shift to the third forward speed is completed.

After the shift to the third forward speed is completed, the sleeve SLE4 of the fourth synchronizer module SL4 is moved to a neutral position.

[Fourth Forward Speed]

If the vehicle speed increases at the third forward speed $3^{RD}$ and shift to the fourth forward speed $4^{TH}$ is necessary, as shown in FIG. 2, the fourth speed gear D4 and the second output shaft OS2 are operably connected through the sleeve SLE4 of the fourth synchronizer module SL4. After that, the second clutch CL2 is released and the first clutch CL1 is operated. Then, the shift to the fourth forward speed is completed.

After the shift to the fourth forward speed is completed, the sleeve SLE5 of the fifth synchronizer module SL5 is moved to a neutral position.

[Fifth Forward Speed]

If the vehicle speed increases at the fourth forward speed $4^{TH}$ and shift to the fifth forward speed $5^{TH}$ is necessary, as shown in FIG. 2, the fifth speed gear D5 and the first output shaft OS1 are operably connected through the sleeve SLE2 of the second synchronizer module SL2. After that, the first clutch CL1 is released and the second clutch CL2 is operated. Then, the shift to the fifth forward speed is completed.

After the shift to the fifth forward speed is completed, the sleeve SLE4 of the fourth synchronizer module SL4 is moved to a neutral position.

[Sixth Forward Speed]

If the vehicle speed increases at the fifth forward speed $5^{TH}$ and shift to the sixth forward speed $6^{TH}$ is necessary, as shown in FIG. 2, the sixth speed gear D6 and the first output shaft OS1 are operably connected through the sleeve SLE3 of the third synchronizer module SL3. After that, the second clutch CL2 is released and the first clutch CL1 is operated. Then, the shift to the sixth forward speed is completed.

After the shift to the sixth forward speed is completed, the sleeve SLE2 of the second synchronizer module SL2 is moved to a neutral position.

[Seventh Forward Speed]

If the vehicle speed increases at the sixth forward speed $6^{TH}$ and shift to the seventh forward speed $7^{TH}$ is necessary, as shown in FIG. 2, the first clutch CL1 is released, and the odd-numbered seventh speed gear D7-1 and the even-numbered seventh speed gear D7-2 are operably connected to the first output shaft OS1 through the sleeve SLE1 of the first synchronizer module SL1 and the sleeve SLE2 of the second synchronizer module SL2. After that, the first and second clutches CL1 and CL2 are simultaneously operated. Then, the shift to the seventh forward speed is completed.

That is, the odd-numbered seventh speed gear D7-1 and the even-numbered seventh speed gear D7-2 are connected to the first output shaft OS1 at the normal seventh forward speed.

In addition, the power transmitting apparatus according to the exemplary embodiment of the present invention can perform skip shift from the seventh forward speed to the first forward speed, the second forward speed, the third forward speed, the fourth forward speed, or the fifth forward speed.

In further detail, if the skip shift from the seventh forward speed to the odd-numbered speed (the first forward speed, the third forward speed or the fifth forward speed) is performed, a vehicle runs with the seventh forward speed by operating the first clutch CL1 in a state that the odd-numbered seventh speed gear D7-1 and the first output shaft OS1 are connected.

In contrast, if the skip shift from the seventh forward speed to the even-numbered speed (the second forward speed or the fourth forward speed) is performed, the vehicle runs with the seventh forward speed by operating the second clutch CL2 in a state that the even-numbered seventh speed gear D7-2 and the first output shaft OS1 are connected.

That is, if the skip shift from the seventh forward speed to the odd-numbered speed or from the odd-numbered speed to the seventh forward speed is performed, the first speed gear D1, the third speed gear D3 or the fifth speed gear D5 is operably connected to the first output shaft OS1 or the second output shaft OS2 in a state that the odd-numbered seventh speed gear D7-1 and the first clutch CL1 are operated. After that, the first clutch CL1 is released and the second clutch CL2 is operated such that the skip shift to the first forward speed, the third forward speed or the fifth forward speed is performed.

After the skip shift from the seventh forward speed to the first forward speed, the third forward speed or the fifth forward speed is completed, the first sleeve SLE1 connecting the odd-numbered seventh speed gear D7-1 and the first output shaft OS1 is moved to the neutral position.

In addition, if the skip shift from the seventh forward speed to the even-numbered speed or from the even-numbered speed to the seventh forward speed is performed, the second speed gear D2 or the fourth speed gear D4 is operably connected to the second output shaft OS2 in a state that the even-numbered seventh speed gear D7-2 and the second clutch CL2 are operated. After that, if the second clutch CL2 is released and the first clutch CL1 is operated such that the skip shift to the second forward speed or the fourth forward speed is performed.

After the skip shift from the seventh forward speed to the second forward speed or the fourth forward speed is completed, the second sleeve SLE2 connecting the even-numbered seventh speed gear D7-2 and the first output shaft OS1 is moved to the neutral position.

In the power transmitting apparatus according to the exemplary embodiment of the present invention, the fourth speed gear D4 and the odd-numbered seventh speed gear D7-1 are simultaneously engaged to the second input gear G2 and the third speed gear D3 and the fifth speed gear D5 are simultaneously engaged to the fourth input gear G4.

Since seven forward speeds can be achieved but the number of input gears disposed on the input shafts can be minimized, a length of a transmission may be reduced. Therefore, layout change of engine compartments and other design change may be prevented.

In addition, referring to FIG. 3, step ratios between shift-speeds are large at a low-speed region where higher output is necessary but are small at a high-speed region where quick shift and driving efficiency is necessary. The fourth speed gear D4 and the odd-numbered seventh speed gear D7-1 having comparatively large gear ratio difference therebetween are simultaneously engaged to the second input gear G2, and the third speed gear D3 and the fifth speed gear D5 having comparatively large gear ratio difference therebetween are simultaneously engaged to the fourth input gear G4 in the exemplary embodiment of the present invention. Therefore, drivability and fuel economy may be improved by preventing distortion of step ratios at the high-speed region.

In addition, since two clutches CL1 and CL2 are operated at the seventh forward speed, drag torque of the clutches is not generated. Therefore, fuel economy may be improved.

In addition, since the speed gears for achieving the seventh forward speed that is the highest shift-speed are provided respectively on the odd-numbered speed side and the even-numbered speed side, skip shift can be performed. Therefore, drivability may be improved.

It is exemplified in this specification but is not limited that the speed gears for achieving the highest shift-speed are provided respectively on the odd-numbered speed side and the even-numbered speed side. That is, speed gears for any shift-speed needed to perform skip downshift or skip upshift may be provided at an odd-numbered shift-speed side and an even-numbered shift-speed side according to types of vehicles by using spirit of the present invention.

Figure 4:
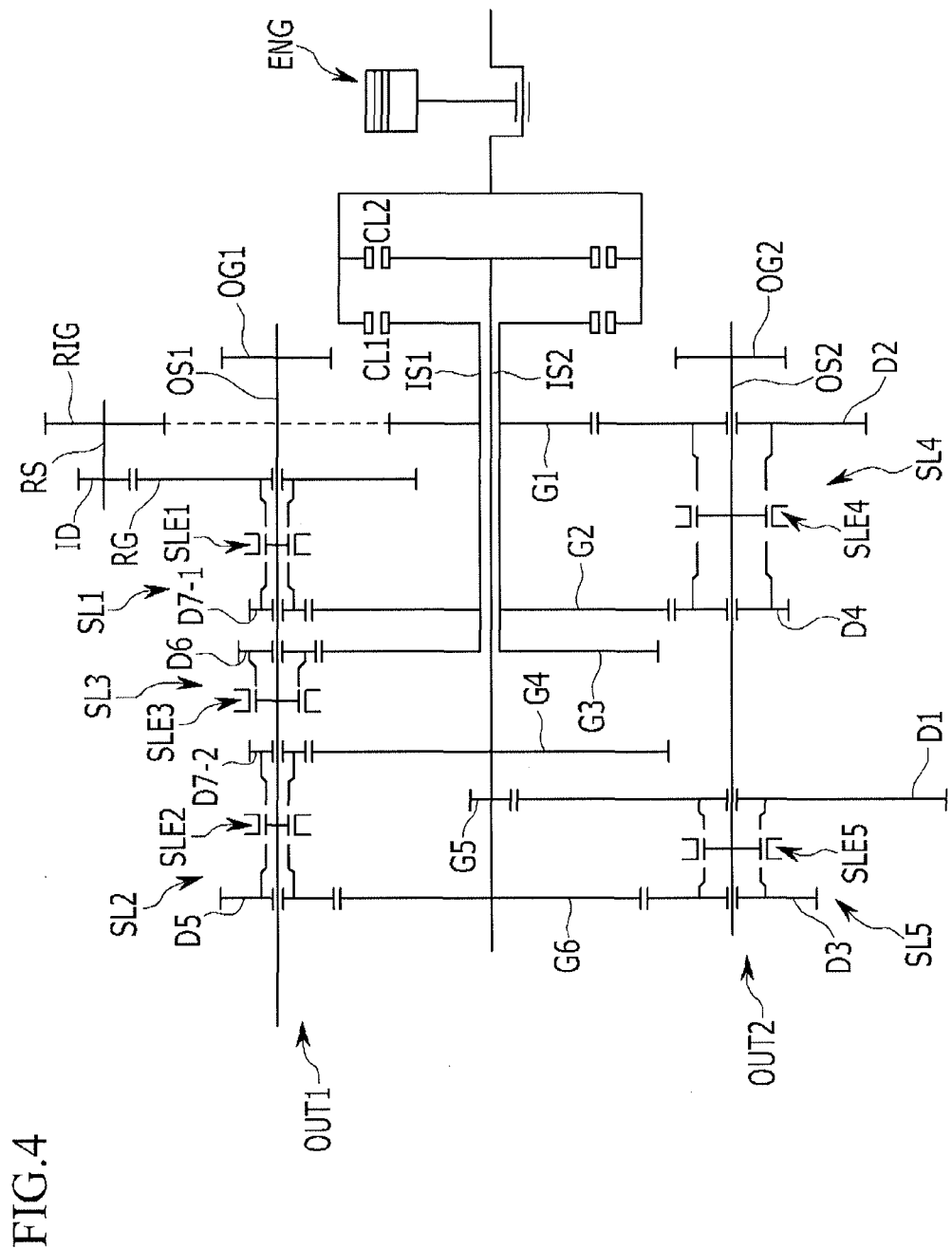
FIG. 4 is a schematic diagram of a power transmitting apparatus for a vehicle according to the various exemplary embodiments of the present invention.

FIG. 4 is a schematic diagram of a power transmitting apparatus for a vehicle according to the second exemplary embodiment of the present invention.

Referring to FIG. 4, positions of the fifth speed gear D5 and the even-numbered seventh speed gear D7-2 and positions of the third speed gear D3 and the first speed gear D1 are changed in the second exemplary embodiment, compared with the first exemplary embodiment.

Therefore, teeth numbers of the input gears are set corresponding to the positional changes of the fifth speed gear D5 and the even-numbered seventh speed gear D7-2 and the positional changes of the third speed gear D3 and the first speed gear D1 in the second exemplary embodiment.

The even-numbered seventh speed gear D7-2 and the fifth speed gear D5 on the first output shaft OS1 are engaged respectively to the fourth input gear G4 and the sixth input gear G6 on the second input shaft IS2, and the first speed gear D1 and the third speed gear D3 on the second output shaft OS2 are engaged respectively to the fifth input gear G5 and the sixth input gear G6 on the second input shaft IS2.

Since functions of the second exemplary embodiment are the same as those of the first exemplary embodiment except positions of the odd-numbered speed gears, detailed description thereof will be omitted.

Figure 5:
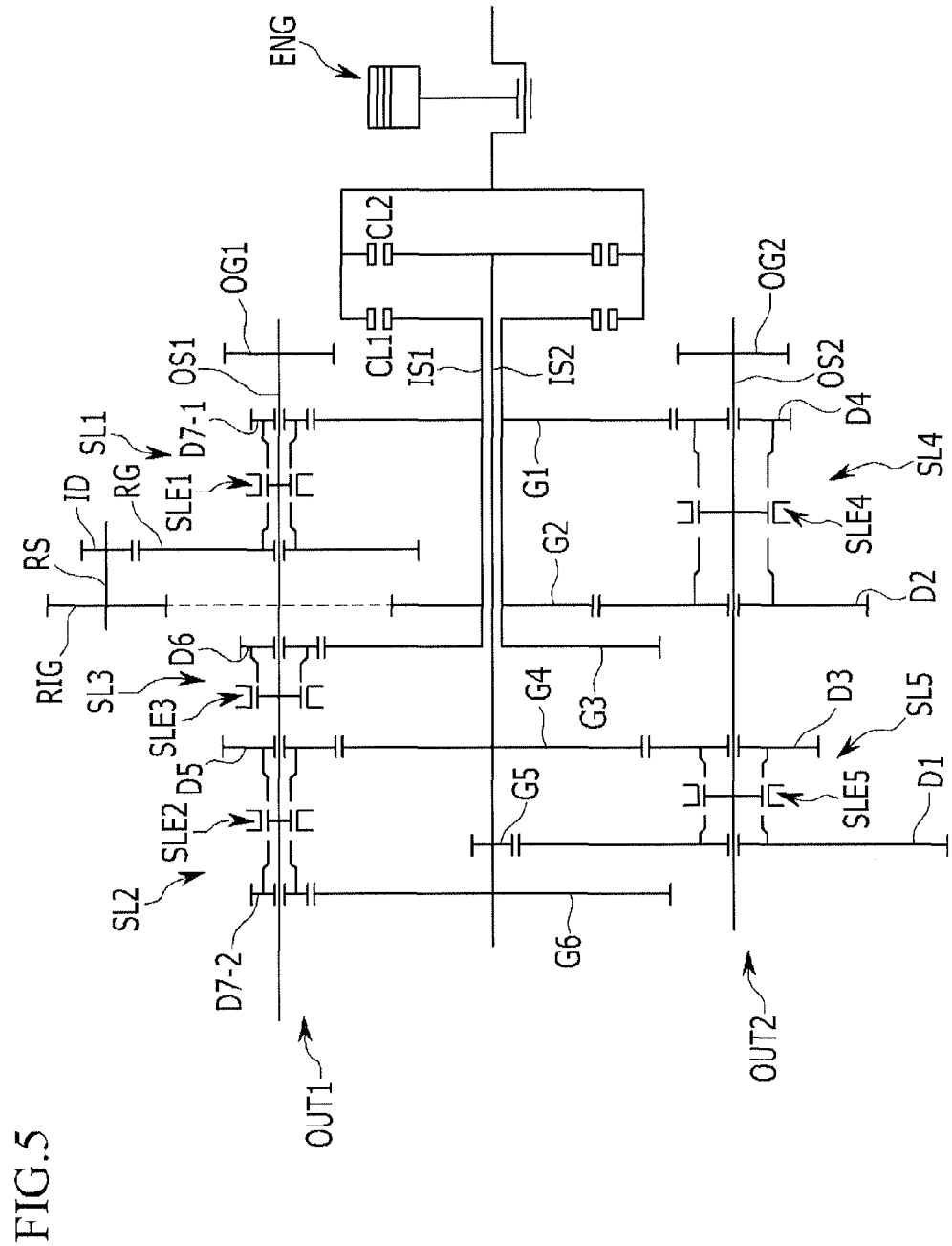
FIG. 5 is a schematic diagram of a power transmitting apparatus for a vehicle according to the various exemplary embodiments of the present invention.

FIG. 5 is a schematic diagram of a power transmitting apparatus for a vehicle according to the third exemplary embodiment of the present invention.

Referring to FIG. 5, positions of the reverse speed gear RG and the odd-numbered seventh speed gear D7-1 and positions of the fourth speed gear D4 and the second speed gear D2 are changed in the third exemplary embodiment, compared with the first exemplary embodiment.

Therefore, teeth numbers of the input gears are set corresponding to the positional changes of the reverse speed gear RG and the odd-numbered seventh speed gear D7-1 and the positional changes of the fourth speed gear D4 and the second speed gear D2 in the third exemplary embodiment.

The odd-numbered seventh speed gear D7-1 and the reverse speed gear RG on the first output shaft OS1 are engaged respectively to the first input gear G1 and the second input gear G2 on the first input shaft IS1, and the fourth speed gear D4 and the second speed gear D2 on the second output shaft OS2 are engaged respectively to the first input gear G1 and the second input gear G2 on the first input shaft IS1.

Since functions of the third exemplary embodiment are the same as those of the first exemplary embodiment except positions of the even-numbered speed gears and the reverse speed gear RG, detailed description thereof will be omitted.

Figure 6:
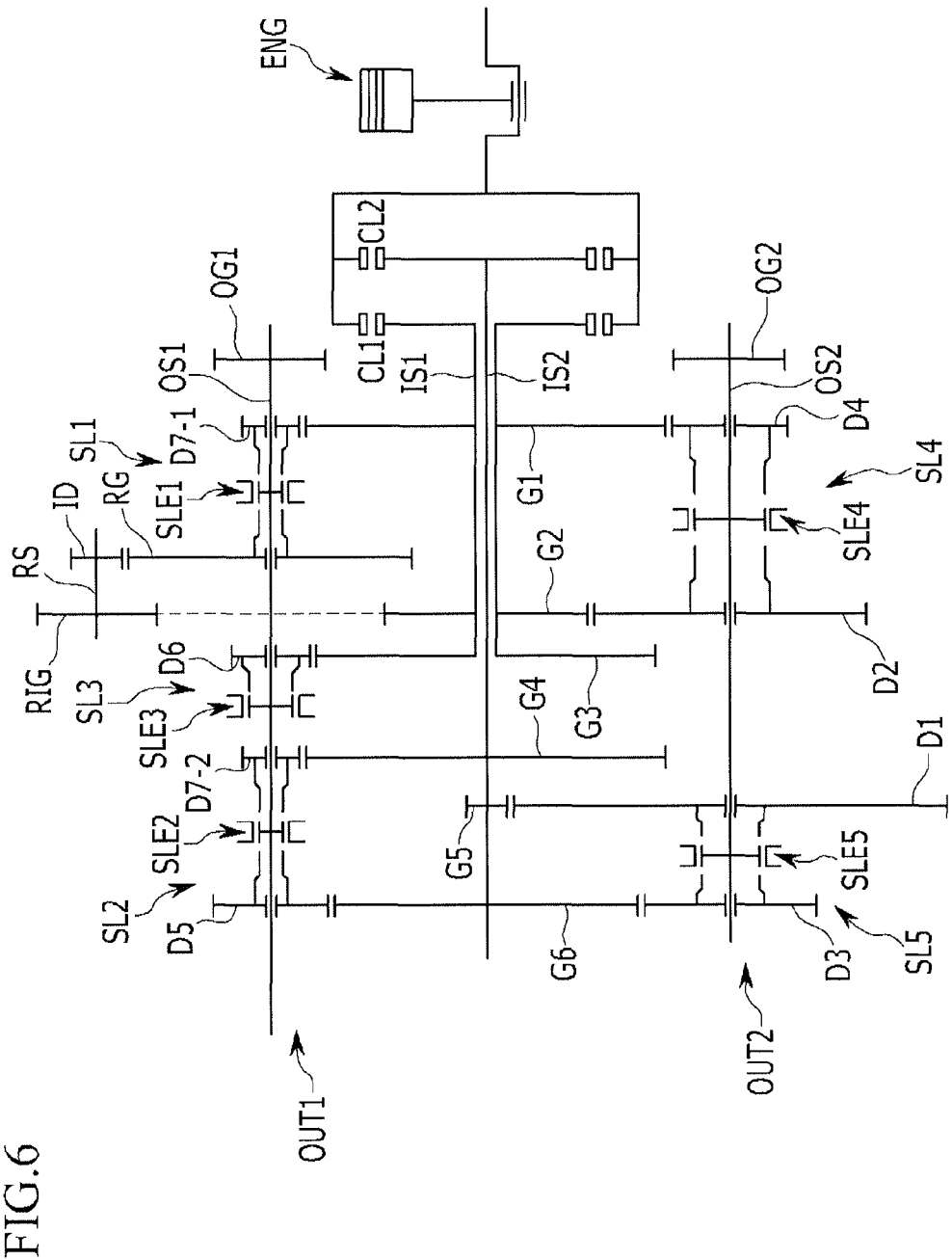
FIG. 6 is a schematic diagram of a power transmitting apparatus for a vehicle according to the various exemplary embodiments of the present invention.

FIG. 6 is a schematic diagram of a power transmitting apparatus for a vehicle according to the fourth exemplary embodiment of the present invention.

Referring to FIG. 6, positions of the fifth speed gear D5 and the even-numbered seventh speed gear D7-2 and positions of the third speed gear D3 and the first speed gear D1 are changed in the fourth exemplary embodiment, compared with the first exemplary embodiment.

In addition, positions of the reverse speed gear RG and the odd-numbered seventh speed gear D7-1 and positions of the fourth speed gear D4 and the second speed gear D2 are changed.

Therefore, teeth numbers of the input gears are set corresponding to the positional changes of the fifth speed gear D5 and the even-numbered seventh speed gear D7-2 and the positional changes of the third speed gear D3 and the first speed gear D1 in the fourth exemplary embodiment.

The even-numbered seventh speed gear D7-2 and the fifth speed gear D5 on the first output shaft OS1 are engaged respectively to the fourth input gear G4 and the sixth input gear G6 on the second input shaft IS2, and the first speed gear D1 and the third speed gear D3 on the second output shaft OS2 are engaged respectively to the fifth input gear G5 and the sixth input gear G6 on the second input shaft IS2.

In addition, teeth numbers of the input gears are set corresponding to the positional changes of the reverse speed gear RG and the odd-numbered seventh speed gear D7-1 and the positional changes of the fourth speed gear D4 and the second speed gear D2 in the fourth exemplary embodiment.

The odd-numbered seventh speed gear D7-1 and the reverse speed gear RG on the first output shaft OS1 are engaged respectively to the first input gear G1 and the second input gear G2 on the first input shaft IS1, and the fourth speed gear D4 and the second speed gear D2 on the second output shaft OS2 are engaged respectively to the first input gear G1 and the second input gear G2 on the first input shaft IS1.

Since functions of the fourth exemplary embodiment are the same as those of the first exemplary embodiment except the positions of the odd-numbered speed gears, the even-numbered speed gears and the reverse speed gear RG, detailed description thereof will be omitted.

In exemplary embodiments of the present invention, the highest shift-speed ($N^{th}$) speed gear and an $(N-3)^{th}$ speed gear are simultaneously engaged to one input gear on the first input shaft, and an $(N-2)^{th}$ speed gear and an $(N-4)^{th}$ speed gear are simultaneously engaged to one input gear on the second input shaft. Since multiple shift-speeds can be achieved but the number of input gears disposed on the input shafts can be minimized, a length of a transmission may be reduced. Therefore, layout change of engine compartments and other design change may be prevented.

Since the speed gears having comparatively large gear ratio different therebetween are simultaneously engaged to one input gear, drivability and fuel economy may be improved by preventing distortion of step ratios at the high-speed region.

In addition, since two clutches CL1 and CL2 are operated at the highest shift-speed, drag torque of the clutches is not generated. Therefore, fuel economy may be improved.

In addition, since the speed gears for achieving the highest shift-speed are provided respectively on the odd-numbered speed side and the even-numbered speed side, skip shift can be performed. Therefore, drivability may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings arrangements included within the spirit and scope of the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus for a vehicle comprising:
   first and second input shafts selectively receiving torque of a power source through first and second clutches;
   first and second output shafts disposed in parallel with the first and second input shafts;
   a plurality of input gears disposed on the first and second input shafts, wherein first, second, and third input gears among the plurality of input gears are disposed on the first input shaft, and fourth, fifth, and sixth input gears among the plurality of input gears are disposed on the second input shaft; and
   first, second, third, fourth, fifth, and sixth speed gears and two seventh speed gears selectively connected to the first and second output shafts through a plurality of synchronizer modules,
   wherein each speed gear of the first, second, third, fourth, fifth, and sixth speed gears and the two seventh speed gears is continuously engaged with each corresponding input gear of the first, second, third, fourth, fifth and sixth input gears such that the torque of the power source is changed by selective operation of the plurality of synchronizer modules and the changed torque is transmitted to the first output shaft or the second output shaft, wherein one seventh speed gear of the two seventh speed gears and the fourth speed gear are disposed respectively on different output shafts of the first and second output shafts and are engaged to a same input gear among the plurality of input gears on the first input shaft, wherein the one seventh speed gear and another seventh speed gear of the two seventh speed gears are disposed on a same output shaft among the first and second output shafts and the another seventh speed gear is engaged to any one of the input gears on the second input shaft, and wherein the power transmitting apparatus further comprises:
  a reverse speed gear rotatably disposed on and selectively and operably connected to any one output shaft of the first and second output shafts;
  a reverse speed shaft disposed in parallel with the first output shaft;
  a reverse input gear fixedly disposed on the reverse speed shaft and engaged with any one input gear on the first input shaft other than the input gear to which the one seventh speed gear and the fourth speed gear are engaged; and
  an idle gear fixedly disposed on the reverse speed shaft and engaged with the reverse speed gear.

2. The power transmitting apparatus of claim 1, wherein the reverse speed gear and the one seventh speed gear selectively connected to the first output shaft through a first synchronizer module, the fifth speed gear and the another seventh speed gear selectively connected to the first output shaft through a second synchronizer module, and the sixth speed gear selectively connected to the first output shaft through a third synchronizer module are disposed on the first output shaft.

3. The power transmitting apparatus of claim 1, wherein the second speed gear and the fourth speed gear selectively connected to the second output shaft through a fourth synchronizer module, and the third speed gear and the first speed gear selectively connected to the second output shaft through a fifth synchronizer module are disposed on the second output shaft.

4. The power transmitting apparatus of claim 2, wherein the reverse speed gear is engaged with the idle gear, the reverse input gear is engaged with the first input gear, the one seventh speed gear is engaged with the second input gear, the fifth speed gear is engaged with the sixth input gear, the another seventh speed gear is engaged with the fourth input gear, and the sixth speed gear is engaged with the third input gear.

5. The power transmitting apparatus of claim 3, wherein the second speed gear is engaged with the first input gear, the fourth speed gear is engaged with the second input gear, the first speed gear is engaged with the fifth input gear, and the third speed gear is engaged with the sixth input gear.

6. The power transmitting apparatus of claim 2, wherein the reverse speed gear is engaged with the idle gear, the reverse input gear is engaged with the second input gear, the one seventh speed gear is engaged with the first input gear, the fifth speed gear is engaged with the fourth input gear, the another seventh speed gear is engaged with the sixth input gear, and the sixth speed gear is engaged with the third input gear.

7. The power transmitting apparatus of claim 3, wherein the second speed gear is engaged with the second input gear, the fourth speed gear is engaged with the first input gear, the first speed gear is engaged with the fifth input gear, and the third speed gear is engaged with the fourth input gear.

8. The power transmitting apparatus of claim 2, wherein the reverse speed gear is engaged with the idle gear, the reverse input gear is engaged with the second input gear, the one seventh speed gear is engaged with the first input gear, the fifth speed gear is engaged with the sixth input gear, the another seventh speed gear is engaged with the fourth input gear, and the sixth speed gear is engaged with the third input gear.

9. The power transmitting apparatus of claim 3, wherein the speed gear is engaged with the second input gear, the fourth speed gear is engaged with the first input gear, the first speed gear is engaged with the fifth input gear, and the third speed gear is engaged with the sixth input gear.

10. A power transmitting apparatus for a vehicle comprising:
  a first clutch connected to a power source and selectively outputting torque of the power source;
  a second clutch connected to the power source and selectively outputting the torque of the power source;
  a first input shaft being a hollow shaft, selectively receiving the torque of the power source through the first clutch, and provided with first, second, and third input gears disposed on an exterior circumference thereof;
  a second input shaft configured for penetrating the first input shaft without rotational interference therebetween, selectively receiving the torque of the power source through the second clutch, and provided with fourth, fifth, and sixth input gears disposed on an exterior circumference thereof;
  first and second output shafts disposed in parallel with the first and second input shafts;
  a reverse speed device including a reverse speed shaft and an idle gear and a reverse input gear fixedly disposed on the reverse speed shaft;
  a reverse speed gear disposed on the first output shaft, selectively connected to the first output shaft through a first synchronizer module, and engaged with the idle gear connected through the reverse speed shaft to the reverse input gear engaged with the first input gear;
  one seventh speed gear disposed on the first output shaft, selectively connected to the first output shaft through the first synchronizer module, and engaged with the second input gear;
  a fifth speed gear disposed on the first output shaft, selectively connected to the first output shaft through a second synchronizer module, and engaged with the sixth input gear;
  another seventh speed gear disposed on the first output shaft, selectively connected to the first output shaft through the second synchronizer module, and engaged with the fourth input gear;
  a sixth speed gear disposed on the first output shaft, selectively connected to the first output shaft through a third synchronizer module, and engaged with the third input gear;
  a second speed gear disposed on the second output shaft, selectively connected to the second output shaft through a fourth synchronizer module, and engaged with the first input gear;
  a fourth speed gear disposed on the second output shaft, selectively connected to the second output shaft through the fourth synchronizer module, and engaged with the second input gear;
a third speed gear disposed on the second output shaft, selectively connected to the second output shaft through a fifth synchronizer module, and engaged with the sixth input gear; and
a first speed gear disposed on the second output shaft, selectively connected to the second output shaft through the fifth synchronizer module, and engaged with the fifth input gear.

11. A power transmitting apparatus for a vehicle comprising:
a first clutch connected to a power source and selectively outputting torque of the power source;
a second clutch connected to the power source and selectively outputting the torque of the power source;
a first input shaft being a hollow shaft, selectively receiving the torque of the power source through the first clutch, and provided with first, second, and third input gears disposed on an exterior circumference thereof;
a second input shaft configured for penetrating the first input shaft without rotational interference therebetween, selectively receiving the torque of the power source through the second clutch, and provided with fourth, fifth, and sixth input gears disposed on an exterior circumference thereof;
first and second output shafts disposed in parallel with the first and second input shafts;
a reverse speed device including a reverse speed shaft and an idle gear and a reverse input gear fixedly disposed on the reverse speed shaft;
a reverse speed gear disposed on the first output shaft, selectively connected to the first output shaft through a first synchronizer module, and engaged with the idle gear connected through the reverse speed shaft to the reverse input gear engaged with the second input gear;
one seventh speed gear disposed on the first output shaft, selectively connected to the first output shaft through the first synchronizer module, and engaged with the first input gear;
a fifth speed gear disposed on the first output shaft, selectively connected to the first output shaft through a second synchronizer module, and engaged with the fourth input gear;
another seventh speed gear disposed on the first output shaft, selectively connected to the first output shaft through the second synchronizer module, and engaged with the sixth input gear;
a sixth speed gear disposed on the first output shaft, selectively connected to the first output shaft through a third synchronizer module, and engaged with the third input gear;
a second speed gear disposed on the second output shaft, selectively connected to the second output shaft through a fourth synchronizer module, and engaged with the second input gear;
a fourth speed gear disposed on the second output shaft, selectively connected to the second output shaft through the fourth synchronizer module, and engaged with the first input gear;
a third speed gear disposed on the second output shaft, selectively connected to the second output shaft through a fifth synchronizer module, and engaged with the fourth input gear; and
a first speed gear disposed on the second output shaft, selectively connected to the second output shaft through the fifth synchronizer module, and engaged with the fifth input gear.

12. A power transmitting apparatus for a vehicle comprising:
a first clutch connected to a power source and selectively outputting torque of the power source;
a second clutch connected to the power source and selectively outputting the torque of the power source;
a first input shaft being a hollow shaft, selectively receiving the torque of the power source through the first clutch, and provided with first, second, and third input gears disposed on an exterior circumference thereof;
a second input shaft configured for penetrating the first input shaft without rotational interference therebetween, selectively receiving the torque of the power source through the second clutch, and provided with fourth, fifth, and sixth input gears disposed on an exterior circumference thereof;
first and second output shafts disposed in parallel with the first and second input shafts;
a reverse speed device including a reverse speed shaft and an idle gear and a reverse input gear fixedly disposed on the reverse speed shaft;
a reverse speed gear disposed on the first output shaft, selectively connected to the first output shaft through a first synchronizer module, and engaged with the idle gear connected through the reverse speed shaft to the reverse input gear engaged with the second input gear;
one seventh speed gear disposed on the first output shaft, selectively connected to the first output shaft through the first synchronizer module, and engaged with the first input gear;
a fifth speed gear disposed on the first output shaft, selectively connected to the first output shaft through a second synchronizer module, and engaged with the sixth input gear;
another seventh speed gear disposed on the first output shaft, selectively connected to the first output shaft through the second synchronizer module, and engaged with the fourth input gear;
a sixth speed gear disposed on the first output shaft, selectively connected to the first output shaft through a third synchronizer module, and engaged with the third input gear;
a second speed gear disposed on the second output shaft, selectively connected to the second output shaft through a fourth synchronizer module, and engaged with the second input gear;
a fourth speed gear disposed on the second output shaft, selectively connected to the second output shaft through the fourth synchronizer module, and engaged with the first input gear;
a third speed gear disposed on the second output shaft, selectively connected to the second output shaft through a fifth synchronizer module, and engaged with the sixth input gear; and
a first speed gear disposed on the second output shaft, selectively connected to the second output shaft through the fifth synchronizer module, and engaged with the fifth input gear.

* * * * *